(12) United States Patent
Aciicmez et al.

(10) Patent No.: US 7,974,409 B2
(45) Date of Patent: Jul. 5, 2011

(54) CHANGING THE ORDER OF PUBLIC KEY CRYPTOGRAPHIC COMPUTATIONS

(75) Inventors: Onur Aciicmez, San Jose, CA (US); Jean-Pierre Seifert, Tirol (AT); Xinwen Zhang, Milpitas, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 937 days.

(21) Appl. No.: 11/849,757

(22) Filed: Sep. 4, 2007

(65) Prior Publication Data

US 2009/0003606 A1    Jan. 1, 2009

Related U.S. Application Data

(60) Provisional application No. 60/946,903, filed on Jun. 28, 2007.

(51) Int. Cl.
    *H04L 9/00* (2006.01)
(52) U.S. Cl. ........... 380/30; 713/174; 713/193; 713/194
(58) Field of Classification Search .................. 380/30; 713/174, 193, 194
    See application file for complete search history.

(56) References Cited

U.S. PATENT DOCUMENTS

| | | | |
|---|---|---|---|
| 5,724,425 A * | 3/1998 | Chang et al. ............ | 705/52 |
| 5,991,415 A | 11/1999 | Shamir | |
| 6,278,783 B1 * | 8/2001 | Kocher et al. .............. | 380/277 |
| 6,304,658 B1 | 10/2001 | Kocher et al. | |
| 6,327,661 B1 | 12/2001 | Kocher et al. | |
| 6,804,782 B1 | 10/2004 | Qiu et al. | |
| 7,000,111 B1 | 2/2006 | Dent et al. | |
| 7,162,032 B2 * | 1/2007 | Brekne ............... | 380/30 |
| 7,194,633 B2 * | 3/2007 | Kaiserswerth et al. ..... | 713/189 |
| 7,221,757 B2 * | 5/2007 | Alao ............... | 380/37 |
| 7,543,159 B2 * | 6/2009 | Baentsch et al. ..... | 713/193 |
| 2001/0002486 A1 * | 5/2001 | Kocher et al. ............. | 713/171 |
| 2008/0104400 A1 * | 5/2008 | Kocher et al. ............. | 713/172 |

OTHER PUBLICATIONS

Werner Schindler, "A Combined Timing and Power Attack". In Proceedings of the 5$^{th}$ International Workshop on Practice and Theory in Public Key Cryptosystems: Public Key Cryptography (Feb. 12-14, 2002). D. Naccache and P. Paillier, Eds. Lecture Notes in Computer Science, vol. 2274, Springer-Verlag Berlin Heidelberg, pp. 263-279.
W. Schindler, C.D. Walter, "More Detail for Combined Timing and Power Attack Against Implementations of RSA". 9$^{th}$ IMA International Conference on Cryptography and Coding, K.G. Paterson, Editor, LNCS Nr. 2898, Springer-Verlag, Berlin Heidelberg, 2003, pp. 245-263.
C.D. Walter, S. Thompson. "Distinguishing Exponent Digits by Observing Modular Subtractions". D. Naccache (Ed.): CT-RSA 2001, LNCS 2020, Springer-Verlag, Berlin Heidelberg, 2001, pp. 192-207.

* cited by examiner

*Primary Examiner* — Nabil M El Hady
(74) *Attorney, Agent, or Firm* — Beyer Law Group LLP

(57) ABSTRACT

In one embodiment, cryptographic transformation of a message is performed by first performing a table initiation phase. This may be accomplished by creating a permutation of an order of powers and then performing a table initiation phase using a part of a key and the permuted order of powers to populate a data structure.

20 Claims, 2 Drawing Sheets

US 7,974,409 B2

CHANGING THE ORDER OF PUBLIC KEY CRYPTOGRAPHIC COMPUTATIONS

CROSS-RELATION TO RELATED APPLICATION

This application claims priority to U.S. Provisional Patent Application No. 60/946,903, entitled "CHANGING THE ORDER OF RSA TABLE COMPUTATIONS TO PREVENT SECURITY ATTACKS ON SOFTWARE RSA IMPLEMENTATION," filed Jun. 28, 2007 by Onur Aciicmez, Jean-Pierre Seifert, and Xinwen Zhang.

BACKGROUND OF THE INVENTION

1. Field of the Invention

The present invention relates to public-key cryptosystems. More specifically, the present invention relates to changing the order of public key cryptographic computations.

2. Description of the Related Art

In public-key cryptosystems, a user is given a pair of cryptographic keys—a public key and a private key. Each of these keys may have one or more values/parameters. The private key is kept secret, while the public key may be widely distributed. The keys are related mathematically, but the private key cannot be practically derived from the public key. A message encrypted with the public key can be decrypted only with the corresponding private key. Similarly, a message signed with a private key can be verified using the public key counterpart of this private key.

One of the most widely used types of public-key encryption is RSA. The main operation in RSA is modular exponentiation. For example, the exponentiation may be $P=M^d \pmod{N}$, wherein M is a message to be decrypted and/or signed, d is the private exponent, which is part of the private key, and N is the public modulus, which is part of the public key. N is usually the product of two large primes p and q, which are parts of the private key. If a malicious user obtains the value of d, he can impersonate the owner of the key and decipher encrypted messages. Other modular exponentiations, such as $M^d \pmod{p}$, where p is a prime number which is also a factor of the public modulus N may also be used.

Efficient RSA implementations typically use certain exponentiation algorithms which require computing the powers of the input message in a modulus. Then, during an exponentiation phase, these powers are used as operands to the modular operations.

One common technique used in RSA is Montgomery multiplication. Montgomery multiplication includes various modular functions along with a conditional substraction step that depends on the values of the operands. This is known as an "extra reduction" step. Due to the presence of this extrareduction step, however, it may be possible for statistical analysis to be used to deduce the value of the exponent(s). This leaves software that utilizes RSA implementations vulnerable to attack.

What is needed is a solution that reduces this security risk.

SUMMARY OF THE INVENTION

In one embodiment, cryptographic transformation of a message is performed by first performing a table initiation phase. This may be accomplished by creating a permutation of an order of powers and then performing a table initiation phase using a part of a key and the permuted order of powers to populate a data structure.

DETAILED DESCRIPTION OF SPECIFIC EMBODIMENTS

Figure 1:
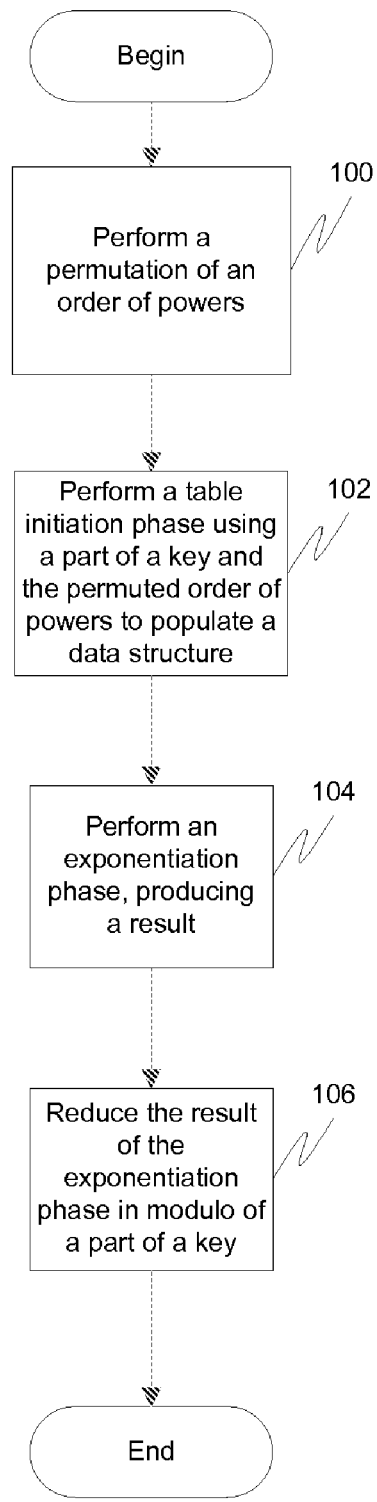
FIG. 1 is a diagram illustrating a method for performing a cryptographic transformation of a message in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In an embodiment of the present invention, the operations of the table initialization phase are dynamically changed. During the initial stage of the table initiation phase, the system may create a random, pseudo-random, or otherwise scrambled permutation of powers. The system may then compute the powers of the input message M following the order in the permutation.

Given the inputs M, d, and N (representing the message, exponent, and modulus, respectively), a typical RSA implementation typically performs the modular exponentiation ($M^d$ mod N) in the following way:

1. Table Initialization Phase

In this phase, the powers of M are computed in mod N and the results stored in a table. More precisely, the following computations are performed:

$e_1=(M \bmod N)$, $e_2=(M^2 \bmod N)$, $e_3=(M^3 \bmod N)$, ..., $e_t=(M^t \bmod N)$ where the value of t depends on the exact exponentiation process used in the implementation.

2. Exponentiation Phase

In this phase, the exponent d is parsed into small windows and a sequence of modular multiplication and square operations is performed based on the values of these windows.

The RSA implementation of OpenSSL, which is the most widely used open source cryptographic library, employs two different exponentiation algorithms depending on the user choice: sliding window and fixed window. In the fixed window exponentiation method, the n-bit exponent d is considered to be in radix-$2^b$ form, i.e., $d=(d_0, d_1, \ldots, d_{k-1})2^b$, where $n=k*b$. For purposes of illustration, an example of the present invention using a fixed window implementation will be described. However, one of ordinary skill in the art will recognize that the present invention may be implemented using any type of exponentiation process and/or public key cryptosystem implementation.

Below is example pseudocode for a fixed window exponentiation method.

```
e₁ = M
for  i from 2 to 2^b - 1
    eᵢ = eᵢ₋₁ * M (mod N)
S = e_{d₀}
for  i from 1 to k - 1
    S = S^{2^b} (mod N)
    if dᵢ ≠ 0 then
        S = S * e_{dᵢ} (mod N)
return S
```

As can be seen, the same $e_i$ values are used as operands during the table initialization phase (the first for-loop) as during the exponentiation phase (the second for-loop). In an embodiment of the present invention, different multiplication operands are used for each of the phases while the overall process still computes the same correct end result.

In an embodiment of the present invention, the operations of the table initialization phase are dynamically changed according to a permutation P. During the initial stage of the table initiation phase, the system may permute the table T and compute T'=P(T). Then the powers of M may be computed following the order indicated in T'.

For example, for a window size of 3, there are typically 8 entries in the table. Let T be a table with t elements: $T_t = \{v_0, v_1, \ldots, v_t\}$, where $v_i = M^i \bmod N$. The first two entries ($v_0, v_1$) typically require no computations, thus the typical computations would only involve computing $T_t = \{v_2, v_3, v_4, v_5, v_6, v_7\}$ in that order. In an embodiment of the present invention, the system first permutes T such that, for example, $T_t = \{v_5, v_3, v_2, v_6, v_4, v_7\}$. The table may then be computed in that order.

Ideally, the permutation should be difficult to predict by an attacker. This may be accomplished by, for example, making the permutation random or pseudo-random. The permutation may be altered after each execution of a table initiation phase, or each cryptographic process. Alternatively, the permutation may be fixed for a period of time or a number of computations, phases, or processes before being changed.

Difficult to predict shall be interpreted to mean a random, pseudo-random, or other number that one of ordinary skill in the art would find difficult to predict. The purpose of this number is so that a would-be interceptor of the message would find it difficult to perform the cryptographic transformation. As such, the goal is to make the permutation difficult for this would-be interceptor to predict, and the difficulty required to predict such a permutation shall be measured by the level of an interceptor of ordinary skill.

FIG. 1 is a flow diagram illustrating a method for performing a cryptographic transformation of a message in accordance with an embodiment of the present invention. In some embodiments of this method, the implementation details described above may be utilized. At 100, a permutation of an order of powers is performed. At 102, a table initiation phase is performed using a part of a key and the permuted order of powers to populate a data structure. This may include computing the powers of the message in modulo of a part of a key, in the order of the permuted order of powers, and storing the computed powers in a data structure.

At 104, an exponentiation phase may be performed, producing a result. At 106, the result of the exponentiation phase may be reduced in modulo of a part of a key.

Figure 2:
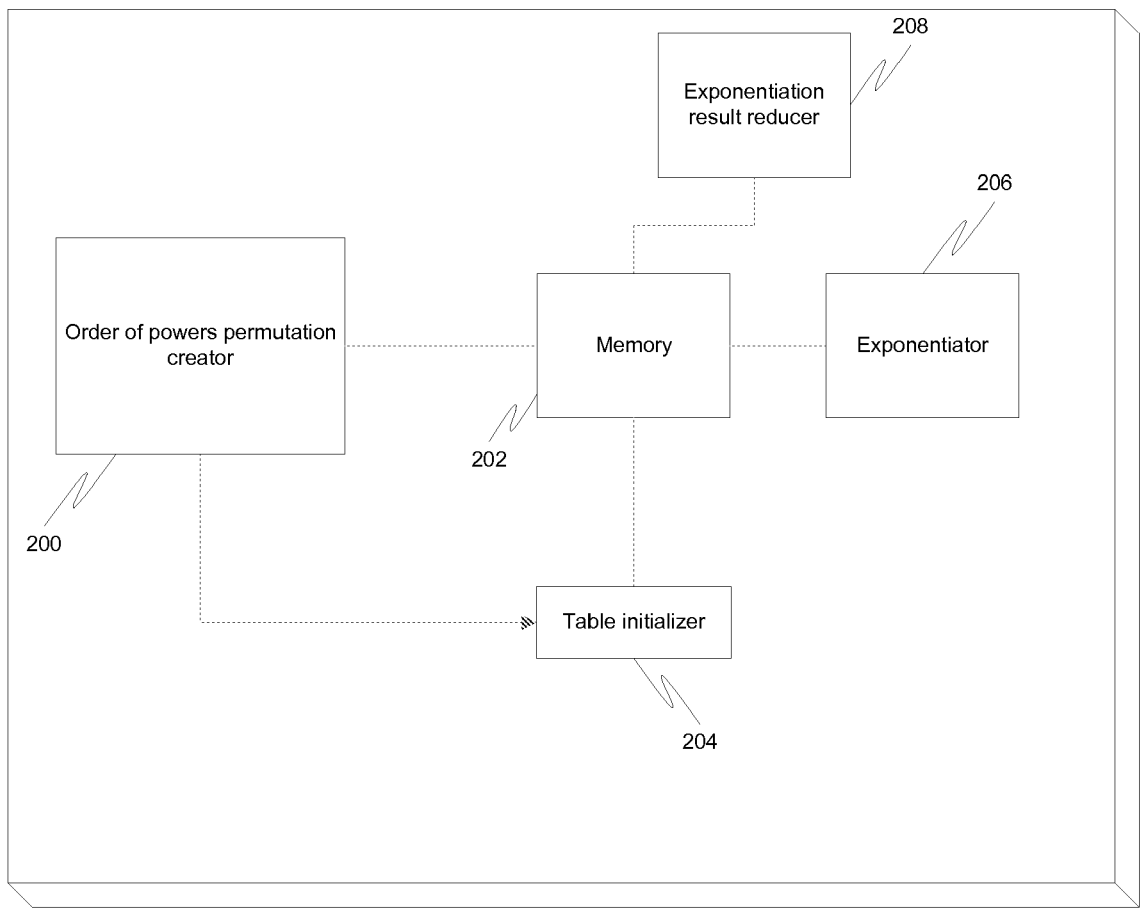
FIG. 2 is a diagram illustrating an apparatus for performing a cryptographic transformation of a message in accordance with an embodiment of the present invention.

FIG. 2 is a block diagram illustrating an apparatus for performing a cryptographic transformation of a message in accordance with an embodiment of the present invention. In some embodiments of this method, the implementation details described above may be utilized. An order of powers permutation creator 200 coupled to a memory 202 may perform a permutation of an order of powers. A table intializer 204 coupled to the order of powers permutation creator 200 and to the memory 202 may perform a table initiation phase using a part of a key and the permuted order of powers to populate a data structure. This may include computing the powers of the message in modulo of a part of a key, in the order of the permuted order of powers, and storing the computed powers in a data structure.

An exponentiator 206 coupled to the memory 202 may perform an exponentiation phase, producing a result. An exponentiation result reducer 208 coupled to the memory 202 may reduce the result of the exponentiation phase in modulo of a part of a key.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for performing a cryptographic transformation of a message, the method comprising:
   receiving the message, an exponent, and a modulus;
   creating a permutation of an order of powers of a value associated with the message such that the permutation is different than a sequence involving sequentially increasing powers;
   performing a table initiation phase using a part of a key and the permuted order of powers to populate a data structure, wherein the performing includes stepping through each power in the permuted order of powers, at each step performing a raise to the power operation on the message using the corresponding power, modulo the modulus, and storing the resulting operands in the data structure;
   performing a randomization of the operands in the data structure; and
   using the randomized operands from the populated data structure to perform an exponentiation phase in order to encrypt or decrypt the message, so that the operands in the exponentiation phase are different than the operands in the table initiation phase.

2. The method of claim 1, wherein the data structure is a table.

3. The method of claim 1, further comprising performing a step from the group consisting of:
   displaying the message on a display;
   displaying an end result of and/or an intermediate result calculated during the method on a display; and
   passing an end result of and/or an intermediate result calculated during the method to an application.

4. The method of claim 1, wherein the message is a combination of at least one of the following:
- a textual message;
- a numerical value;
- a portion of a binary file;
- an ordered sequence of bits;
- a portion of a video;
- a portion of an audio file; and
- a digital certificate.

5. The method of claim 1, further comprising:
reducing the result of the exponentiation phase in modulo of a part of a key.

6. The method of claim 1, wherein the permutation is a substantially random permutation.

7. The method of claim 1, wherein the performing a table initiation phase using a part of a key and the permuted order of powers to populate a data structure includes storing the resulting operands in the data structure in the order in which they were computed.

8. An apparatus for performing a cryptographic transformation of a message, the apparatus comprising:
- a memory;
- an order of powers permutation creator coupled to the memory, wherein the order of powers permutation creator is configured to:
  - receive a message, exponent, and modulus;
  - create a permutation of an order of powers of a value associated with the message, such that the permutation is different than a sequence involving sequentially increasing powers; and
- a table initializer coupled to the order of powers permutation creator and to the memory and configured to perform a table initiation phase using a part of a key and the permuted order of powers to populate a data structure, wherein the performing includes stepping through each power in the permuted order of powers, at each step performing a raise to the power operation on the message using the corresponding power, modulo the modulus, and store the resulting operands in the data structure, as well as perform a randomization of the operands in the data structure.

9. The apparatus of claim 8, further comprising:
an exponentiator coupled to the memory.

10. The apparatus of claim 9, further comprising:
an exponentiation result reducer coupled to the memory.

11. The apparatus of claim 8, wherein the table initializer is further configured to store the resulting operands in the data structure in the order in which they were computed.

12. An apparatus for performing a cryptographic transformation of a message, the apparatus comprising:
- means for receiving the message, an exponent, and a modulus;
- means for creating a permutation of an order of powers of a value associated with the message such that the permutation is different than a sequence involving sequentially increasing powers;
- means for performing a table initiation phase using a part of a key and the permuted order of powers to populate a data structure, wherein the performing includes stepping through each power in the permuted order of powers, at each step performing a raise to the power operation on the message using the corresponding power, modulo the modulus, and storing the resulting operands in the data structure;
- means for performing a randomization of the operands in the data structure;
- means for using the randomized operands from the populated data structure to perform an exponentiation phase in order to encrypt or decrypt the message, so that the operands in the exponentiation phase are different than the operands in the table initiation phase; and
- a processor configured to interact with the means for receiving, means for creating, means for performing a table initiation phase, means for performing a randomization, and means for using in order to arrange processing of functions thereof.

13. The apparatus of claim 12, wherein the data structure is a table.

14. The apparatus of claim 12, further comprising means for performing a step from the group consisting of:
- displaying the message on a display;
- displaying an end result of and/or an intermediate result calculated during the method on a display; and
- passing an end result of and/or an intermediate result calculated during the method to an application.

15. The apparatus of claim 12, wherein the message is a combination of at least one of the following:
- a textual message;
- a numerical value;
- a portion of a binary file;
- an ordered sequence of bits;
- a portion of a video;
- a portion of an audio file; and
- a digital certificate.

16. The apparatus of claim 12, further comprising:
means for reducing the result of the exponentiation phase in modulo of a part of a key.

17. The apparatus of claim 12, wherein the permutation is a substantially random permutation.

18. The apparatus of claim 12, wherein the means for performing a table initiation phase using a part of a key and the permuted order of powers to populate a data structure includes means for storing the resulting operands in the data structure in the order in which they were computed.

19. A program storage device readable by a machine tangibly embodying a program of instructions executable by the machine to perform a method for performing a cryptographic transformation of a message, the method comprising:
- receiving the message, an exponent, and a modulus;
- creating a permutation of an order of powers of a value associated with the message such that the permutation is different than a sequence involving sequentially increasing powers;
- performing a table initiation phase using a part of a key and the permuted order of powers to populate a data structure, wherein the performing includes stepping through each power in the permuted order of powers, at each step performing a raise to the power operation on the message using the corresponding power, modulo the modulus, and storing the resulting operands in the data structure;
- performing a randomization of the operands in the data structure; and
- using the randomized operands from the populated data structure to perform an exponentiation phase in order to encrypt or decrypt the message, so that the operands in the exponentiation phase are different than the operands in the table initiation phase.

20. The program storage device of claim 19, wherein the performing a table initiation phase using a part of a key and the permuted order of powers to populate a data structure includes storing the resulting operands in the data structure in the order in which they were computed.

* * * * *